(No Model.)

DE WANE B. SMITH.
SWIVEL HOSE COUPLING.

No. 601,683. Patented Apr. 5, 1898.

WITNESSES
Rich. A. George

INVENTOR
DE WANE B. SMITH
By Milton E. Robinson
ATTORNEY.

THE NORRIS PETERS CO., PHOTO-LITHO., WASHINGTON, D. C.

UNITED STATES PATENT OFFICE.

DE WANE B. SMITH, OF DEERFIELD, NEW YORK.

SWIVEL HOSE-COUPLING.

SPECIFICATION forming part of Letters Patent No. 601,683, dated April 5, 1898.

Application filed October 18, 1897. Serial No. 655,561. (No model.)

*To all whom it may concern:*

Be it known that I, DE WANE B. SMITH, of Deerfield, in the county of Oneida and State of New York, have invented certain new and useful Improvements in Swivel Hose-Couplings; and I do hereby declare that the following is a full, clear, and exact description of the invention, which will enable others skilled in the art to which it appertains to make and use the same, reference being had to the accompanying drawings, and to the letters and figures of reference marked thereon, which form a part of this specification.

Figure 1:
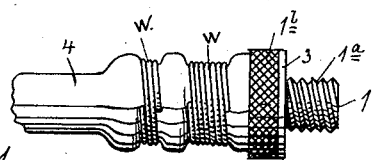
Figure 2:
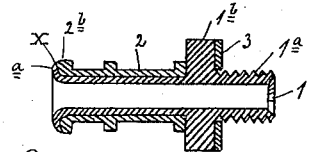
Figure 3:
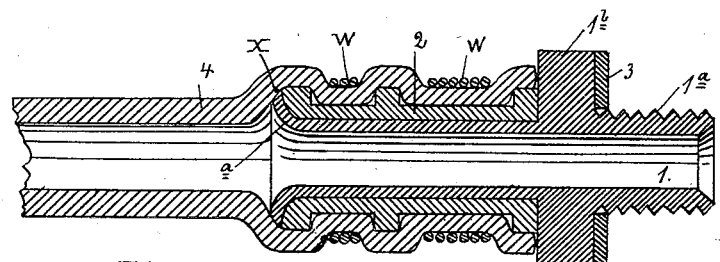
Figure 4:
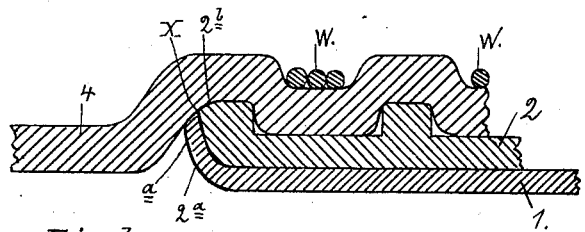

Figure 1 shows the swivel-coupling in connection with a piece of hose attached. Fig. 2 shows a longitudinal section of the swivel. Fig. 3 shows a longitudinal section on an enlarged scale. Fig. 4 shows a partial longitudinal section on a further enlarged scale.

The body 1 of the swivel is tubular and is provided with an externally-screw-threaded end $1^a$ and a knurled enlargement $1^b$, by means of which the body may be readily rotated with the fingers. The body on the opposite side of the enlargement from the screw-thread is arranged to receive a sleeve 2. The sleeve 2 is provided with a substantially square end at one end adapted to engage with one side of the enlargement $1^b$ and at the other is provided with an undercut round $2^a$ and an overcut round $2^b$. The end of the tubular body is flared, as shown at $a$, to conform to the undercut round $2^a$ of the sleeve, and the edge or end of the flare is formed to a completement of the outside round $2^b$ of the end of the sleeve 2.

The hose 4, having in itself a certain amount of contractibility, is slipped over the end of the swivel and secured to the sleeve 2 by wiring $w$ into grooves provided on the exterior of sleeve. It will be noted that the hose is expanded in inserting the swivel, and the hose binds tightly over the end of the joint at $x$, between the sleeve and body, thereby stopping any leakage that might otherwise occur.

In case the sleeve should be shorter than the portion of the body on which it is mounted the contraction of the hose over the rounded end will work the sleeve toward the left as the device is shown in the drawings and close the joint tightly at this end.

This swivel-coupling is particularly intended for use with bicycle-pumps and is attached to or detached from the pneumatic-tire fixture by rotating the body of the device so as to screw the swivel to or unscrew it from the tire-fixture. There may be provided a packing-ring 3 to pack this joint.

What I claim as new, and desire to secure by Letters Patent, is—

1. The combination in a hose-swivel of the tubular body having one end screw-threaded, and the other flared, of a sleeve mounted on the body and having a rounded end conforming on the exterior with the flared end of the body, substantially as set forth.

2. The combination with the hose of a swivel consisting of a tubular body having a screw-thread at one end and flared at the other end, of a sleeve mounted on the body the end of the sleeve and flared end of the body being made to conform whereby the hose covers and closes the joint, substantially as set forth.

In witness whereof I have affixed my signature in presence of two witnesses.

DE WANE B. SMITH.

Witnesses:
P. P. SMITH,
E. W. JONES.